United States Patent
Qian et al.

(10) Patent No.: US 10,033,911 B2
(45) Date of Patent: Jul. 24, 2018

(54) ILLUMINATION ASSEMBLY

(71) Applicant: Cognex Corporation, Natick, MA (US)

(72) Inventors: Feng Qian, Natick, MA (US); Michael Moed, Hopkinton, MA (US); John Filhaber, Natick, MA (US)

(73) Assignee: Cognex Corporation, Natick, MA (US)

( * ) Notice: Subject to any disclaimer, the term of this patent is extended or adjusted under 35 U.S.C. 154(b) by 214 days.

(21) Appl. No.: 15/191,691

(22) Filed: Jun. 24, 2016

(65) Prior Publication Data

US 2016/0381264 A1    Dec. 29, 2016

Related U.S. Application Data (60) Provisional application No. 62/185,539, filed on Jun. 26, 2015.

(51) Int. Cl.
| | |
|---|---|
| H04N 5/225 | (2006.01) |
| G02B 19/00 | (2006.01) |
| F21V 7/04 | (2006.01) |
| F21V 5/04 | (2006.01) |
| F21V 5/00 | (2018.01) |
| F21V 7/00 | (2006.01) |
| F21Y 115/10 | (2016.01) |
| F21Y 115/30 | (2016.01) |

(52) U.S. Cl.
CPC ....... *H04N 5/2256* (2013.01); *G02B 19/0028* (2013.01); *G02B 19/0085* (2013.01); *F21V 5/004* (2013.01); *F21V 5/04* (2013.01); *F21V 7/0091* (2013.01); *F21Y 2115/10* (2016.08); *F21Y 2115/30* (2016.08)

(58) Field of Classification Search
CPC ...... H04N 5/2256; H04N 5/2253; F21V 5/04; F21V 5/004; F21V 7/0091; G02B 19/0028; G02B 19/0085; F21Y 2115/10; F21Y 2115/30
See application file for complete search history.

(56) References Cited

U.S. PATENT DOCUMENTS

| | | | |
|---|---|---|---|
| 6,033,094 A | 3/2000 | Sohn | |
| 6,671,452 B2 * | 12/2003 | Winston | .................... F21V 5/02 359/559 |
| 6,859,326 B2 | 2/2005 | Sales | |
| 7,255,456 B2 * | 8/2007 | Yao | ....................... G02B 5/0215 362/225 |

(Continued)

FOREIGN PATENT DOCUMENTS

WO    2013025842 A1    2/2013

OTHER PUBLICATIONS

Anwar, Apple Awarded Patent That Covers Kinect-Style 3D Mapping on Mac, iPhone, http://techfrag.com/2014/12/11/apple-awarded-patent-covers-kinect-style-3d-mapping-mac-iphone/, 2014, 6 pages.

*Primary Examiner* — William C Dowling
(74) *Attorney, Agent, or Firm* — Quarles & Brady LLP (57) ABSTRACT

An illumination assembly is provided for use with a light source and an illumination target. A first light collector can be disposed to receive and direct light from the light source. A first diffuser can be disposed at least partly between the first light collector and the illumination target. The first diffuser can be configured to diffuse at least part of the light directed by the first light collector to provide a first illumination pattern on the illumination target.

20 Claims, 9 Drawing Sheets

(56) References Cited

U.S. PATENT DOCUMENTS

| | | | |
|---|---|---|---|
| 7,295,262 B2* | 11/2007 | Mi | G02B 6/0053 |
| | | | 349/64 |
| 8,550,633 B2* | 10/2013 | Utsunomiya | G02B 27/48 |
| | | | 349/64 |
| 8,896,925 B2 | 11/2014 | Kim et al. | |
| 2003/0095400 A1* | 5/2003 | Kashima | G02B 6/0038 |
| | | | 362/601 |
| 2010/0226127 A1* | 9/2010 | Bigliatti | F21V 5/00 |
| | | | 362/235 |
| 2011/0280040 A1* | 11/2011 | Schick | F41G 1/345 |
| | | | 362/559 |

* cited by examiner

ILLUMINATION ASSEMBLY

CROSS-REFERENCE TO RELATED APPLICATIONS

This application claims priority to U.S. Provisional Patent Application No. 62/185,539, which was filed on Jun. 26, 2015.

STATEMENT REGARDING FEDERALLY SPONSORED RESEARCH OR DEVELOPMENT

Not applicable.

BACKGROUND OF THE TECHNOLOGY

The present technology relates to illumination of illumination targets, and more specifically, to assemblies for illuminating illumination targets for imaging systems.

In imaging and other systems, it can be useful to illuminate a target with a high quality illumination pattern. For example, machine vision systems can be configured to capture images of an object or process, analyze the images to identify relevant characteristics, actions, and so on, and instruct various devices (e.g., manufacturing or sorting devices) based upon the image analysis. In this context, the quality of the illumination pattern used can directly affect the quality of the images captured and thereby affect the utility and accuracy of the resulting image analysis. Accordingly, there is a need for high quality illumination assemblies for machine vision and other systems.

Conventional illumination assemblies can include bare illumination assemblies, in which illumination is provided from light sources to illumination targets without intervening diffusers or other secondary optics. Bare illumination can create generally circular illumination patterns with Gaussian (or Gaussian-like) intensity profiles, such that central areas of the illumination patterns are significantly brighter than the edges. This can result in low light efficiency, as a significant portion of light from the light sources can fall outside the relevant areas (e.g., fields of view of associated imaging devices). Similarly, given the non-uniformity of the intensity profiles, relatively powerful light sources or a relatively large number of overlapping light sources may be needed to cover the relevant area (e.g., the fields of view of the imaging devices) with sufficiently intense illumination.

Conventional illumination assemblies can also include light sources in combination with secondary optics such as aspherical or free-form lenses. However, conventional secondary optics systems can be difficult and expensive to implement. Further, use of conventional secondary optics can also result in low lighting efficiency, and may not produce suitable illumination patterns for some applications.

BRIEF SUMMARY OF THE TECHNOLOGY

Embodiments of the technology overcome the disadvantages of the prior art by providing improved illumination patterns, including illumination patterns with relatively large areas of relatively homogenous illumination and relatively low incidence of lighting "hot spots."

Accordingly, some embodiments include an illumination assembly for directing light from a first light source onto an illumination target. A first light collector can be disposed to receive light from the first light source. A first optical wedge can be disposed at least partly between the first light collector and the illumination target. A first diffuser can be disposed at least partly between the first optical wedge and the illumination target, and can be separated from the first optical wedge by a first air gap. The first light collector can at least partly collimate the light received from the first light source. The first optical wedge can bend the at least partly collimated light towards the first diffuser. The first diffuser can diffuse at least part of the light bent by the first optical wedge to provide a first illumination pattern on the illumination target.

Some embodiments include an illumination assembly for use with a machine vision system with a lens assembly, to direct light onto an illumination target. A first light collector can be disposed to receive and direct light from a first extended light source. A first diffuser can be disposed at least partly between the first light collector and the illumination target. The first diffuser can be configured to diffuse at least part of the light directed by the first light collector to provide a first illumination pattern on the illumination target.

Some embodiments include an illumination assembly for use with an imaging device having a mounting frame and a lens assembly with a lens axis, to direct light onto an illumination target. A light source arrangement can be supported by the mounting frame and can at least partly surround the lens axis. A light collector array can be disposed between the light source arrangement and the illumination target, can be supported by the mounting frame, can at least partly surround the lens axis, and can include a collimator array, and a wedge array. A diffuser array can be disposed between the light collector array and the illumination target, and can be separated from the light collector array by an air gap. The collimator array can be arranged to receive and at least partly collimate light from the light source arrangement. The wedge array can be arranged so that light from the collimator array is directed towards the diffuser array. The diffuser array can be configured to diffuse at least part of the light from the collimator array to provide an overlapping illumination pattern on the illumination target.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE TECHNOLOGY

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, aspects of the disclosed subject matter can be implemented as a system, method, apparatus, or article of manufacture using standard programming and/or engineering techniques and/or programming to produce hardware, firmware, software, or any combination thereof to control an electronic based device to implement aspects detailed herein.

Unless otherwise specified or limited, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

Unless otherwise specified or limited, the term "between," in the context of light transmission, refers to location with respect to a path of the relevant light. In this regard, for example, a first light-transmission or light-producing object or device can be viewed as "between" second and third light-transmission or light-producing objects or devices if the path of travel of the relevant light passes to (or through) the first object or device en route from the second to the third object or device. In this regard, it will be understood that such a first object or device can sometimes be viewed as "between" such second and third objects or devices, with respect to light transmission, even if the first object or device is not physically located in a space separating the second and third objects or devices.

As used herein, the term "processor" can include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs can be stored and/or data communications can be buffered. The term "memory" can also include other types of memory or combinations thereof.

Embodiments of the technology are described below by using diagrams to illustrate either the structure or processing of embodiments used to implement the embodiments of the present technology. Using the diagrams in this manner to present embodiments of the technology should not be construed as limiting of its scope.

Various embodiments of the disclosed illumination assemblies are described herein in connection with a machine vision system including an electronic imaging device and associated processing devices. That is because the features and advantages of the disclosure are well suited for this purpose. Still, it should be appreciated that the various aspects of the disclosure can be applied in the context of other types of systems, including machine vision systems other than those specifically discussed herein (e.g., handheld imaging systems) and any other system that may benefit from high quality illumination.

Figure 1:
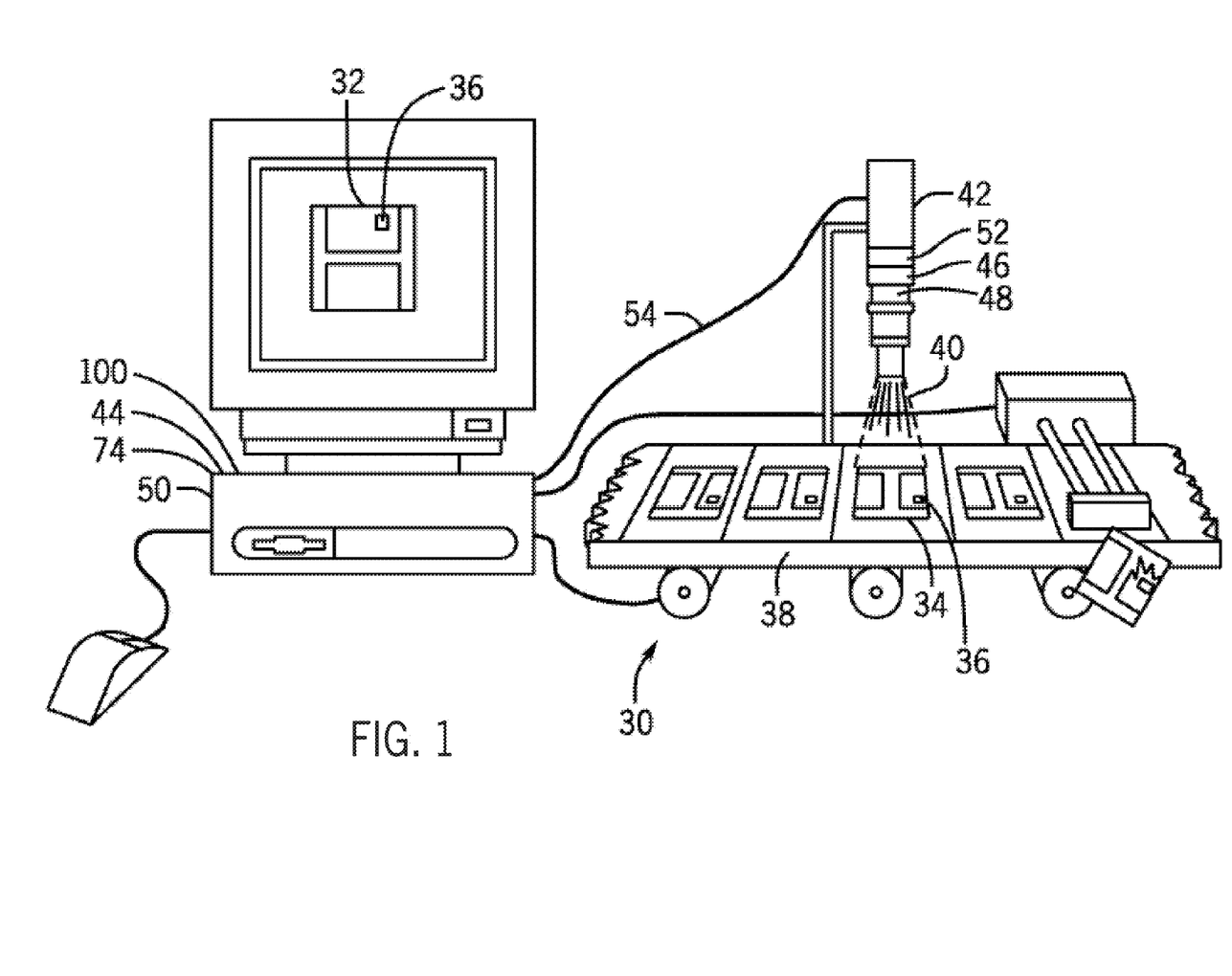
FIG. 1 is a schematic view of an example machine vision system.

Machine vision systems can be used in manufacturing, assembly, test, measurement, automation, and control applications, among others, as non-limiting examples. FIG. 1 illustrates an example machine vision system 10 adapted to acquire one or more images 12 of an object 14 containing a machine readable symbol 16. Machine vision system 10 can use image acquisition software 24 operable to perform any of various types of image acquisitions. For example, in the embodiment illustrated, the conveyor 18 transports the objects 14 along a conveyor path and thereby causes relative movement between the objects 14 and a field of view 20 of an imaging device 22. Accordingly, as the conveyor 18 operates, the machine vision system 10 can capture successive images of the objects 14 (or other subjects). In other embodiments, images of other objects or other operations can also (or alternatively) be acquired.

The imaging device 22 can include a processor 26, which can be configured, for example, for image processing and decoding. In some embodiments, the processor 26 can be coupled to an imaging sensor 28, being, for example, either part of the imaging sensor 28 or linked to the imaging sensor 28. In some embodiments, the processor 26 can be encoded with or otherwise configured to execute, the image acquisition software 24 (or other software). In some embodiments, the image acquisition software 24 (or other software) can be run on a separate computing device 30 or processor. Generally, the computer 30 can be used, for example, for uploading and downloading the images 12 (e.g., after acquisition by the imaging device 22, or various degrees of processing). As such, for example, a communication line 34 can be coupled to the imaging device 22 to provide a connection to the computer 30. It is to be appreciated that wireless communications are also contemplated.

Generally, the image acquisition software 24 can be configured to, among other things, control acquisition of multiple images (e.g., within a single reading operation), control illumination of an illumination target, acquire image data, and process/decode the acquired image data into usable information. For example, the image acquisition software 24 (or other software or hardware) can be configured to process image information from the sensor 28 in order to identify particular features of an object in one or more images (e.g., edges or shapes on the object 14), to identify movements represented in one or more images (e.g., passage of the object 14 on the conveyor 18), or to identify and decode various symbols (e.g., one- or two-dimensional bar codes, or textual labels or markings).

The imaging device 22 can also include a memory medium 32 coupled to the imaging sensor 28 and/or the processor 26. The memory medium 32 can be used for storing scanned or processed images 12, buffering data and communications, storing software, and the like.

Figure 2:
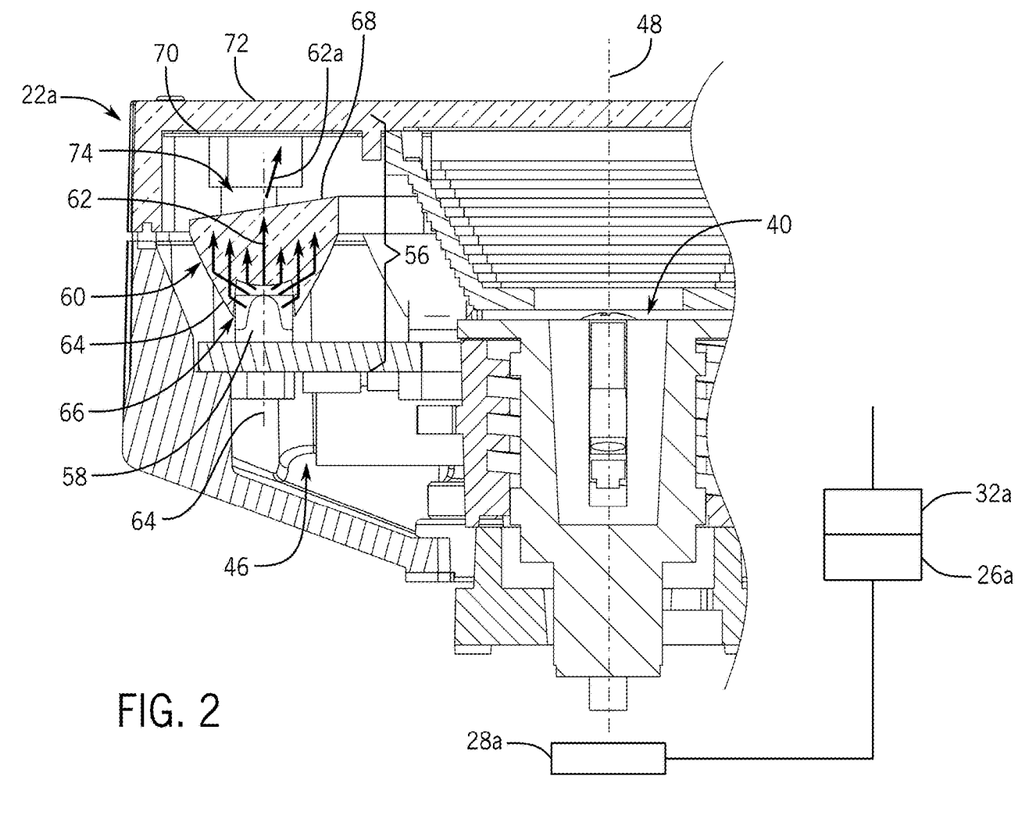
FIG. 2 is a partial cross-sectional view an imaging system for use with the machine vision system of FIG. 1, with an illumination assembly in accordance with some embodiments of the disclosure.

As illustrated in FIG. 2, an example imaging device 22a for the machine vision system 10 can include a lens assembly 40 to direct light from a field of view of the imaging device 22a (e.g., a filed of view similar to the field of view 20 of FIG. 1) to an imaging sensor 28a. Similarly to the imaging sensor 28, the imaging sensor 28a can be configured to produce electronic image information based upon light received from the lens assembly 40 and to transmit that information to a processor 26a, a memory medium 32a, and so on for further operations. The lens assembly 40 defines a primary lens axis 48 for the imaging device 22a, with the field of view of the imaging device 22a being generally centered on the lens axis 48. The imaging device 22a also includes a mounting frame 46, which can generally support the lens assembly 40, the sensor 28a, and other imaging device components.

To assist in capturing images with the lens assembly 40 and the sensor 28a, it can be useful to configure an illumination assembly for the imaging device 22a to provide appropriate lighting for an illumination target within the field of view of the lens assembly 40. Generally, an illumination target can be a feature, object, or region which is to be illuminated for a particular purpose, such as the imaging of a decodable symbol. In the context of the machine vision system 10 and the imaging device 22a, for example, an illumination target can be a region within the field of view of the imaging device 22a within which images of an object or symbol will be captured (e.g., as centered on the lens axis 48 at a particular distance from the lens assembly 40).

FIG. 2 illustrates an example illumination assembly 56 that can usefully provide relatively uniform illumination of an illumination target, with relatively low incidence (or significant diffusion) of "hot spots" from individual light sources. In the embodiment illustrated, the illumination assembly 56 is integrated into the imaging device 22a, with various components of the illumination assembly 56 being supported by the mounting frame 46. In other embodiments, the illumination assembly 56 (or other illumination assemblies) can be mounted separately from the imaging device 22a, can be mounted to portions of the imaging device 22a other than the mounting frame 46, or can be disposed for use with another imaging device (not shown). For example, the illumination assembly 56 (or other illumination assemblies) can be formed as a module for various imaging devices, which can be added to an appropriate imaging device as needed (e.g., for particular installations or operations).

In order to provide illumination, an illumination assembly generally includes at least one light source, which can be disposed, configured, and controlled in various ways. As illustrated in FIG. 2, the illumination assembly 56 includes an extended light source 58 configured as a light-emitting diode ("LED") supported by the mounting frame 46, with the light source 58 generally facing towards the field of view of the imaging device 22a and the corresponding illumination target (i.e., generally facing upward, from the perspective of FIG. 2). In other embodiments, other types of light sources (e.g., filament- or gas-based light sources, laser light sources, and so on) can be used.

LEDs, and other extended light sources, can tend to produce light over a relatively wide angle. To help direct this light toward an illumination target within the field of view of the imaging device 22a, a light collector, such as light collector 60, can be disposed between the light source 58 and the illumination target to receive light from the light source 58. In the embodiment illustrated, the light collector 60 is configured as a generally conical total internal reflection ("TIR") collector, which is disposed on the mounting frame 46 so that a collection recess 66 of the light collector 60 partly surrounds the light source 58. Such an arrangement can, for example, help the light collector 60 to capture a relatively large percentage of the light from the light source 60 for redirection towards the relevant field of view.

Due to its shape and interfaces, upon receiving relatively diffuse light from the light source 58 (e.g., as represented by an example light ray 62), the light collector 60 at least partly collimates the received light so that the light travels generally in parallel with a primary (e.g., central) light axis 64 of the light collector 60. In the embodiment illustrated, the light axis 64 is generally parallel with the lens axis 48, and light collimated by the light collector 60 is accordingly directed along rays that are generally parallel with the lens axis 48. In other embodiments, other arrangements can be possible.

In the embodiment illustrated, the light source 58 is generally aligned with (e.g., centered with respect to) the primary light axis 64 of the light collector 60. In other embodiments, as also discussed below, a light source can be offset relative to a light axis of a collector. For example, in some embodiments, the light source 58 can be shifted to the right or to the left (from the perspective of FIG. 2) relative to the position illustrated in FIG. 2 so that a center (or central region) of the light source 58 is offset from the light axis 64.

Even if a light collector such as the light collector 60 does not adequately collimate light received from a light source, or if no light collector or other collimator is provided, some light emitted from the light source can intersect the field of view of the relevant imaging device and thereby provide some illumination for images captured by the imaging device. However, particularly in view of the general need to locate light sources (and any light collectors) outside of a line of sight between a lens assembly and a relevant field of view (e.g., at positions offset from the lens axis 48, such an arrangement can generally result in a relatively poor illumination of the field of view. Use of multiple light sources (with corresponding light collectors) can help to address this problem, with overlapping illumination patterns of the various light sources helping to provide more illumination for the field of view. However, while this approach this can sometimes increase the cost and space requirements for the relevant system, and may not necessarily result in sufficient illumination of the field of view.

Accordingly, in some embodiments, an illumination assembly according to this disclosure can include a feature to redirect light from the light collector towards an illumination target. In the embodiment illustrated in FIG. 2, for example, the light collector 60 is configured to direct the light received from the light source 58 through an optical wedge 68 that is disposed between the collimating portion of the light collector 60 and the field of view of the imaging device 22a. The optical wedge 68 generally exhibits an exit surface (i.e., the upper surface, in the orientation illustrated in FIGS. 2 and 3) that is disposed at an angle to the light axis 64 (and the lens axis 48). Accordingly, light exiting the optical wedge 68 is generally bent towards the primary light axis 48 and, correspondingly, also towards a central region of the field of view of the imaging device 22a. This bending of the light from the light collector 60 can be seen, for example, in the bending of the example light ray 62 into a light ray 62a, as the light ray 62 exits the optical wedge 68.

In the embodiment illustrated in FIG. 2, the optical wedge 68 exhibits an angle of approximately −9 degrees, with respect to a reference line extending perpendicularly to the lens axis 48 and the light axis 64. In other embodiments, other angles can be used, depending on the distance of a relevant illumination target from the imaging device 22a, the distance of the light axis 64 from the lens axis 48, or various other factors. As also discussed below, some embodiments of the technology can employ multiple optical wedges arranged around a lens assembly. It will be understood that a second optical wedge disposed opposite the lens assembly 40 from the optical wedge 68 (not shown in FIG. 2) can exhibit a generally opposite slope to the optical wedge 68 (e.g., can exhibit an equal, but opposite angle), such that the second optical wedge can also direct light towards the lens axis 48. Likewise, other optical wedges in other positions can be angled appropriately (e.g., relative to a plane perpendicular to the lens axis 48) to provide a desired convergence of light from various light sources.

Also in the embodiment illustrated in FIG. 2, the optical wedge 68 is integrally formed as an angled end wall of the light collector 60. In other embodiments, an optical wedge can be formed and installed separately from a collimator or other light collector.

In some embodiments, a single light collector and optical wedge can be provided for a particular light source. For example, as illustrated in FIG. 2, the optical wedge 68 and the light collector 60 (as part of an integrally formed single light-collector body) are provided for the single light source 58. In some embodiments, multiple light collectors or optical wedges can be configured to collimate and direct light from one or more light sources.

In some embodiments, additional devices for manipulating light from the light source 58 can be disposed between the light source 58 and the relevant illumination target. For example, a diffuser such as a micro-lens array ("MLA") 70 can be disposed between the optical wedge 68 and the illumination target in order to diffuse light from the optical wedge 68 into an illumination pattern on the relevant illumination target.

Generally, MLAs can contain multiple micro-lenses formed in a one-dimensional or two-dimensional array on a supporting substrate such as glass or quartz. Depending on the configuration of the particular micro-lenses and the array as a whole, MLAs can then direct incident (e.g., collimated) light into particular patterns or towards particular regions of an illumination target. For example, due to the configuration of the MLA 70, as well as the collimation and bending of the light from the light source 58 by the light collector 60 and the wedge 68, the MLA 70 can generally direct light from the light source 58 towards a central region of the field of view of the imaging device 22a and the corresponding illumination target. Further, the MLA 70 can generally diffuse light received from a light source, so that the light is relatively evenly distributed over an illumination target (e.g., in a plurality of patterns corresponding to the plurality of micro-lenses in the MLA 70) rather than concentrated in a "hot spot" for the light source.

The MLA 70 can also be configured to direct light received from a light source into a particular shape. For example, the MLA 70 can be configured to direct light received from the wedge 68 (and the light collector 60, generally) into a substantially rectangular, substantially diffuse illumination pattern, with dimensions similar to the field of view of the imaging device 22a at a relevant distance along the lens axis 48, and with relatively homogeneous light intensity across the illumination pattern. Collectively, this functionality of the MLA 70 can provide a useful illumination pattern for image capture by the imaging device 22a.

In some embodiments, a diffuser can be configured to produce non-rectangular illumination patterns. For example, an MLA configured to be installed similarly to the MLA 70 can be configured to produce hexagonal, circular, or other illumination patterns. In some embodiments, an MLA can be configured to produce somewhat non-homogenous illumination patterns, such as illumination patterns with greater intensity at the edges or corners than at a central area. This can be useful, for example, in order to compensate for lens vignetting or other effects. In some embodiments, other optical devices or structures can be used as an alternative (or in addition) to the MLA 70. For example, in some embodiments, holographic or Fresnel diffusers, other lenslet arrays, velum paper, or opal glass can be used as diffusers in place of (or in addition to) the MLA 70.

The MLA 70 can be installed on the imaging device 22a (or elsewhere) in various ways. In the embodiment illustrated in FIG. 2, for example, the MLA 70 is configured as a microarray film that is attached to an interior surface of a transparent front window 72 of the imaging device 22a. In some embodiments, the MLA 70 (or another MLA) can be configured as a non-film body, can be molded into (or onto) the front window 72, or can be otherwise formed or installed.

Generally, a diffuser of an illumination assembly according to this disclosure can be spaced apart from a relevant light collector, so that an appropriate (e.g., appropriately large) illumination pattern can be provided. As illustrated in FIG. 2, for example, the MLA 70 is generally separated from the optical wedge 68 by an air gap 74. In other embodiments, other configurations are possible.

Figure 3:
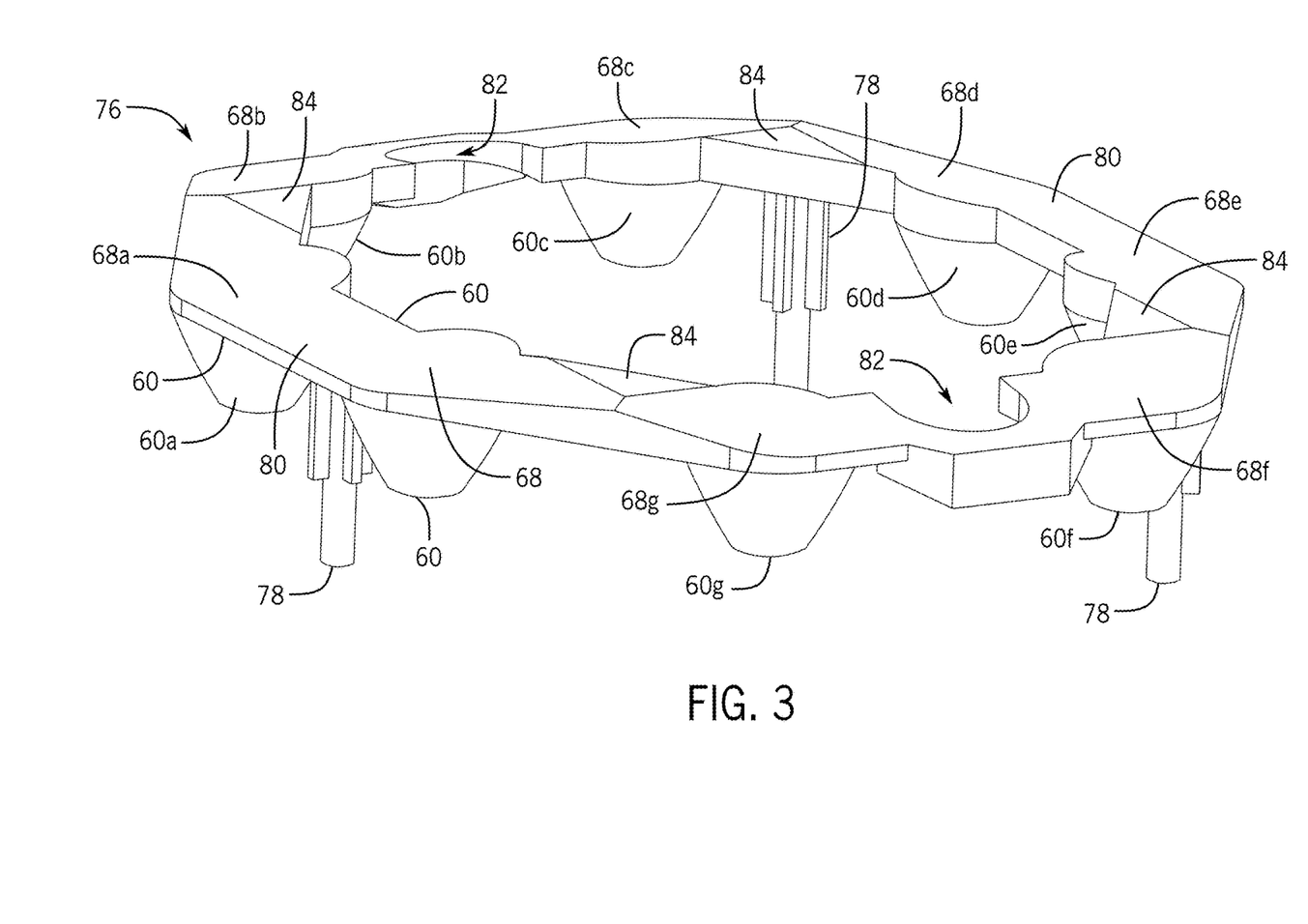
FIG. 3 is a front, top, left isometric view of an integral light-collector body for use with the illumination assembly of FIG. 2.

In some embodiments, multiple light collectors and optical wedges (or other components) can be formed as part of an integral light-collector body. As illustrated in FIG. 3, for example, the light collector 60 and optical wedge 68 can be formed as part of an integral light collector-body 76 for use with the imaging device 22*a* (or another imaging device).

In the embodiment illustrated in FIG. 3, the light-collector body 76 includes the light collector 60, with the integral optical wedge 68, as well as seven other similarly configured collimating light collectors 60*a* through 60*g*, each including a respective integral optical wedge 68*a* through 68*g*. Accordingly, when the light-collector body 76 is mounted to the imaging device 22*a* (e.g., secured to the mounting frame 46 using mounting posts 78), the eight light collectors 60 and 60*a* through 60*g* and the corresponding optical wedges 68 and 68*a* through 68*g* can collimate and direct light from eight different light sources (not shown), such as eight different LED lights sources arranged in a light-source array around the lens assembly 40. Further, with an appropriately disposed diffuser, such as an extended configuration of the MLA 70 (see FIG. 2) that is disposed between the light-collector body 76 and an illumination target, the light-collector body 76 can form part of an illumination assembly that provides substantially uniform illumination of a relevant portion of the illumination target.

The light-collector body 76 can be formed in various ways using various materials. In some embodiments, for example, the light-collector body 76 can be formed from molded plastic. In other embodiments, other materials can be used. In the embodiment illustrated in FIG. 3, the light-collector body 76 provides a relatively compact component, which can require relatively little space in an imaging device body or a machine vision system. It will be understood, however, that other configurations are possible. For example, in some embodiments, a light-collector array similar to the integral light-collector body 76 can be formed from multiple, smaller light-collector bodies (not shown).

Various additional features can be included on the light-collector body 76 in order to assist in manufacturing or installation, or to address other relevant issues. In the embodiment illustrated, for example, intermediary wedge portions 80 are formed between the wedges 68 and 68*a*, and between the wedges 68*d* and 68*e*, to provide generally continuous wedge surfaces including, respectively, the wedges 68 and 68*a*, and the wedges 68*d* and 68*e*. The intermediary wedge portions 80 need not necessarily play a significant role in collimating and directing light from the various light sources, but can provide general structural strength for the light-collector body 76 and allow for improved ease and efficiency in manufacturing or installation of the light-collector body 76.

Additional structural features can also be included. For example, in order to accommodate various internal features of the imaging device 22*a*, intermediary rounded cut-outs 82 are formed between the wedges 68*b* and 68*c*, and between the wedges 68*f* and 68*g*. In the embodiment illustrated, cross-pieces 84 are also included to generally strengthen the light-collector body 76.

Figure 4:
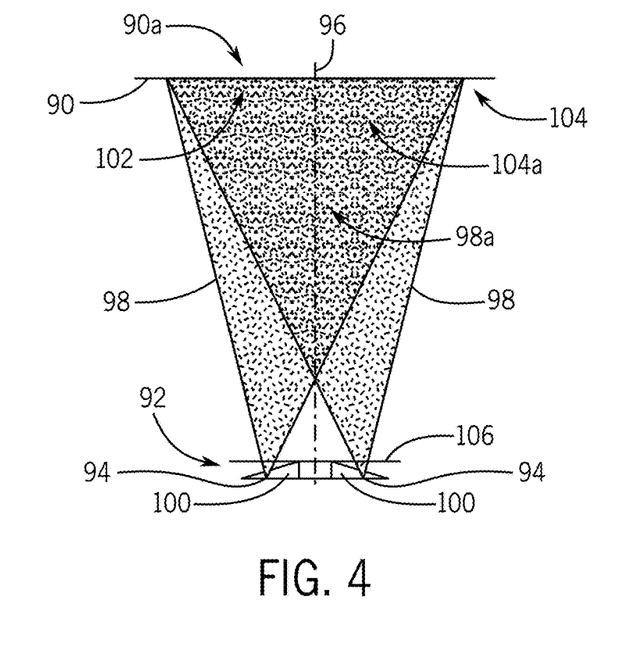
FIG. 4 is a schematic view of an illumination of a target using an illumination assembly similar to that of FIG. 2.
Figure 5:
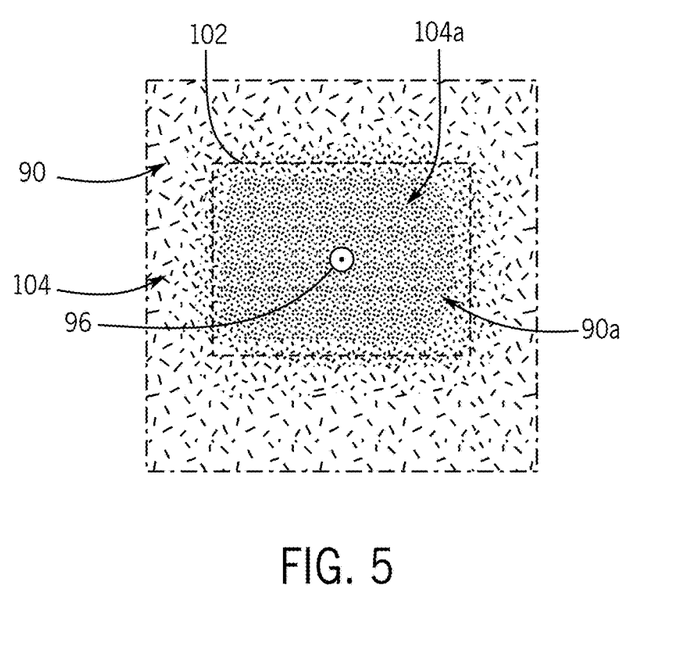
FIG. 5 is a schematic view of an illumination pattern on the target of FIG. 4, as provided by the illumination assembly of FIG. 4.

As also noted above, a light-collector body similar to the light-collector body 76, employed in an illumination assembly similar to the illumination assembly 56, can generally provide a substantially uniform illumination pattern on an illumination target, as may be helpful for machine vision (and other) operations. As illustrated in FIGS. 4 and 5, for example, an illumination target 90 can be substantially uniformly illuminated using an illumination assembly 92 that is generally similar to the illumination assembly 56 (see FIG. 2). Like the illumination assembly 56 (see FIG. 2), the illumination assembly 92 can be integrated into an imaging device (not shown in FIGS. 4 and 5), or can be configured as a standalone module (or modules) that can be installed into a variety of imaging devices as needed.

In the illumination assembly 92, multiple light sources 94 are arranged around a central axis 96 (e.g., a lens axis), with the light sources 94 generally directing light towards the illumination target 90. Further, optical wedges 100 are disposed between the light sources 94 and the illumination target 90, so that light from each of the light sources 94 passes through a respective one of the optical wedges 100 before reaching the illumination target 90. In some embodiments, light from the light sources 94 can be collimated (e.g., using one or more TIR collectors similar to the light collectors 60 (not shown in FIGS. 4 and 5)) before reaching the optical wedges 100.

Once light from the light sources 94 reaches the optical wedges, the optical wedges 100 direct the light towards the illumination target 90 along light paths 98, substantial respective portions 98*a* of which overlap with each other. Accordingly, as illustrated in particular in FIG. 5, an enlarged central region 90*a* of the illumination target 90, corresponding to a central region 104*a* of a collective illumination pattern 104 that is formed by the overlapping of respective illumination patterns of the light sources 94, can be illuminated relatively brightly and uniformly.

In some embodiments, a diffuser can be provided in order to direct light from the light sources 94 into particular illumination patterns. As illustrated in FIG. 4, for example, an MLA 106 disposed between light sources 94 and the illumination target 90, and separated from the wedges 100 by an air gap, is configured to diffuse light from the light sources 94 into generally rectangular illumination patterns, which overlap to provide the relatively uniform, generally rectangular form of the central region 104*a* of the illumination pattern 104. In other embodiments, other configurations are possible.

In some embodiments, an imaging device (not show in FIGS. 4 and 5) can be disposed to image an imaging area 102 on the illumination target 90. As illustrated in particular in FIG. 5, substantially all of the imaging area 102 is overlaid by the portion of the illumination pattern 104 over which the light paths 98 (and the corresponding illumination patterns) for the light sources 94 overlap. Accordingly, nearly the entire the imaging area 102 can be illuminated with a relatively bright and relatively homogenous light pattern and the imaging device may be able to acquire particularly high quality images of the nearly the entire imaging area 102.

In the embodiment illustrated in FIGS. 4 and 5, the overlapping portion of the illumination pattern 104 is substantially contained within the imaging area 102. In some embodiments, the illumination assembly can be configured such that the bright, overlapping portion of the illumination pattern 104 (or other illumination pattern) extends entirely over, or even beyond, the imaging area 102 (or other imaging area).

Figure 6:
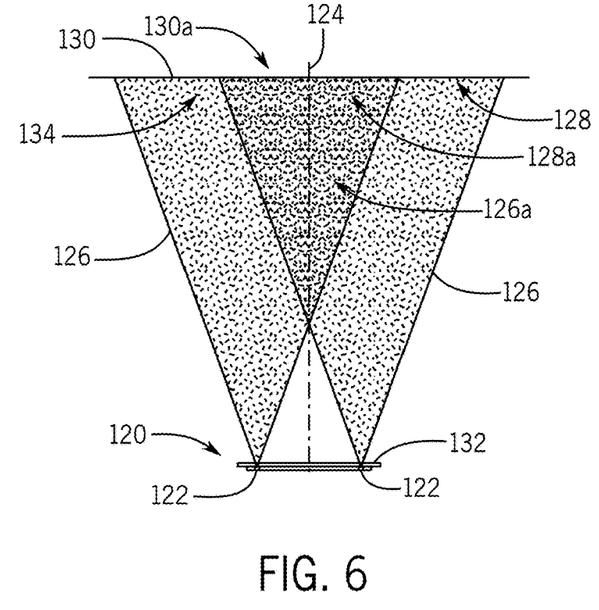
FIG. 6 is a schematic view of an illumination of a target using another illumination assembly in accordance with some embodiments of the disclosure.
Figure 7:
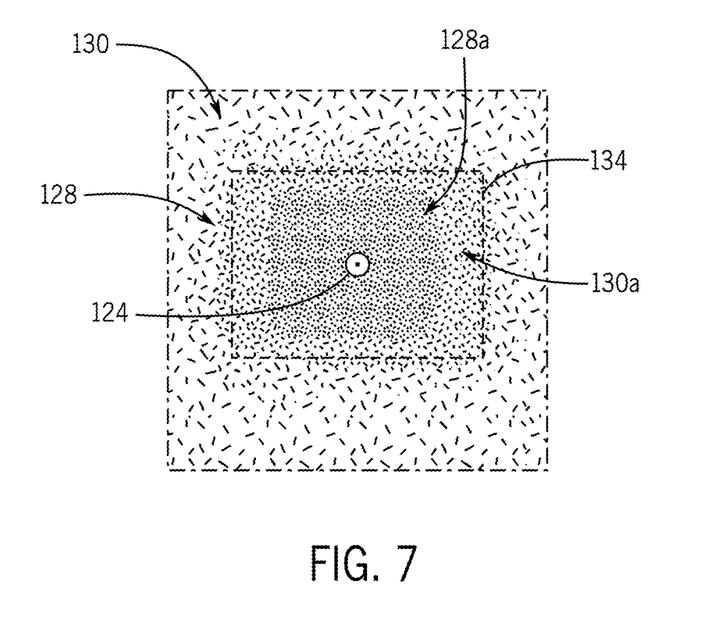
FIG. 7 is a schematic view of an illumination pattern on the target of FIG. 6, as provided by the illumination assembly of FIG. 6.

In some embodiments, an illumination assembly can be provided without wedges similar to the wedge 68 (see, e.g., FIG. 2) or the wedges 100. As illustrated in FIG. 6, for example, an illumination assembly 120 according to another embodiment of the disclosure includes multiple light sources 122 arranged around a central axis 124 (e.g., a lens axis) to generally direct light along respective light paths 126 to provide a collective, overlapping illumination pattern 128 on an illumination target 130. Generally, substantial portions 126a of the light paths 126 overlap, so that a central region 130a of the illumination target 130 is illuminated by both of the light sources 122. Accordingly, as illustrated in FIG. 7, the central region 130a of the illumination target 130 can be illuminated relatively brightly. Like the illumination assemblies 56 and 92 (see FIGS. 2 and 4), the illumination assembly 100 can be integrated into an imaging device (not shown in FIGS. 6 and 7), or can be configured as a standalone module (or modules) that can be installed into a variety of imaging devices as needed.

In some embodiments, a diffuser can be provided in order to direct light from the light sources 122 into particular illumination patterns. As illustrated in FIG. 6, for example, an MLA 132 (or another diffuser) can be configured to direct light from the light sources 122 into respective rectangular illumination patterns that overlap to provide the relatively uniform, generally rectangular form of a central region 128a of the illumination pattern 128. In other embodiments, other configurations are also possible.

In some embodiments, an imaging device (not shown in FIGS. 6 and 7) can be disposed to image an imaging area 134 on the illumination target 130. As illustrated in particular in FIG. 7, a substantial portion of the imaging area 134 is overlaid by the portion of the illumination pattern 128 over which the light paths 112 (and the corresponding illumination patterns) for the light sources 122 overlap. Accordingly, a substantial portion of the imaging area 134 can be illuminated with a relatively bright and relatively homogenous light pattern and the imaging device may be able to acquire particularly high quality images of the imaging area 134.

In some embodiments, wedges can be used to direct light by adjusting the physical orientation of various light sources rather than (or in addition to) redirecting light rays. In an illumination assembly 148 illustrated in FIGS. 8 and 9, for example, light sources 150 are arranged around a central axis 152 to direct light towards an illumination target 154. The light sources 150 are mounted on top of structural wedges 158 (e.g., angled support surfaces), with the wedges 158 mounted in turn, for example, to a mounting body of an imaging device or other structure (not shown in FIGS. 8 and 9). Accordingly, the light sources 150 are tilted somewhat towards the central axis 152, so that light from the light sources 150 travels generally along light paths 156, substantial portions 156a of which overlap with each other. As illustrated in particular in FIG. 9, this can result in a relatively large overlap between illumination patterns of the respective light sources 150, with a correspondingly large central region 160a of a collective illumination pattern 160 being thereby projected onto a central region 154a of the illumination target 154. Like the illumination assemblies 56, 92, and 120 (see FIGS. 2, 4, and 6), the illumination assembly 100 can be integrated into an imaging device (not shown in FIGS. 8 and 9), or can be configured as a standalone module (or modules) that can be installed into a variety of imaging devices as needed.

Figure 8:
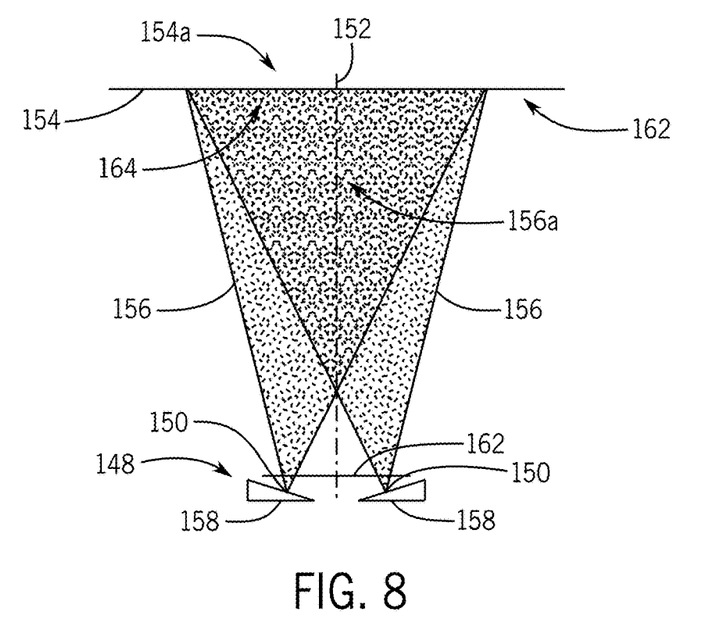
FIG. 8 is a schematic view of an illumination of a target using yet another illumination assembly in accordance with some embodiments of the disclosure.

In some embodiments, a diffuser can be provided in order to direct light from the light sources 150 into particular illumination patterns. As illustrated in FIG. 8, for example, an MLA 162 (or other diffuser) disposed between the light sources 150 and the illumination target 154 is configured to diffuse light from the light sources 150 into generally rectangular illumination patterns, which overlap to provide the relatively uniform, generally rectangular form of the central region 160a of the illumination pattern 160. In other embodiments, other configurations are possible.

In some embodiments, an imaging device (not show in FIGS. 8 and 9) can be disposed to image an imaging area 164 on the illumination target 154. As illustrated in particular in FIG. 9, substantially all of the imaging area 164 is overlaid by the portion of the illumination pattern 160 over which the light paths 156 (and the corresponding illumination patterns) for the light sources 150 overlap. Accordingly, nearly the entire the imaging area 164 can be illuminated with a relatively bright and relatively homogenous light pattern and the imaging device may be able to acquire particularly high quality images of the nearly the entire imaging area 164.

Figure 9:
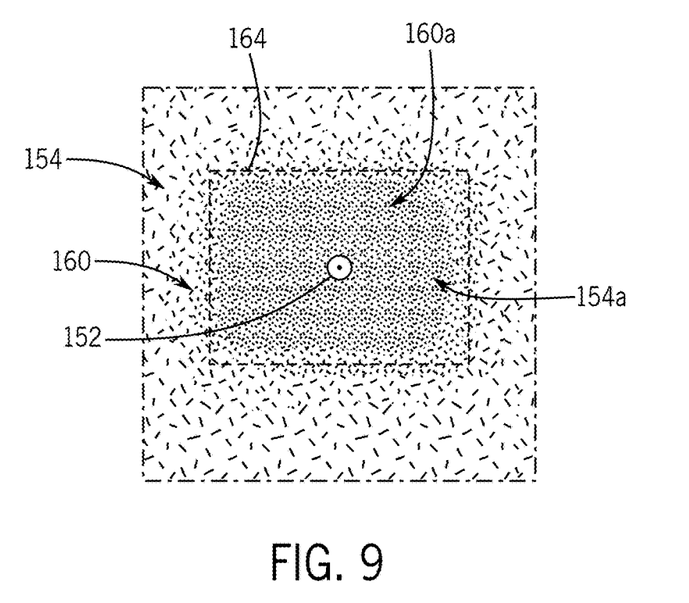
FIG. 9 is schematic view of an illumination pattern on the target of FIG. 8, as provided by the illumination assembly of FIG. 8.
Figure 10:
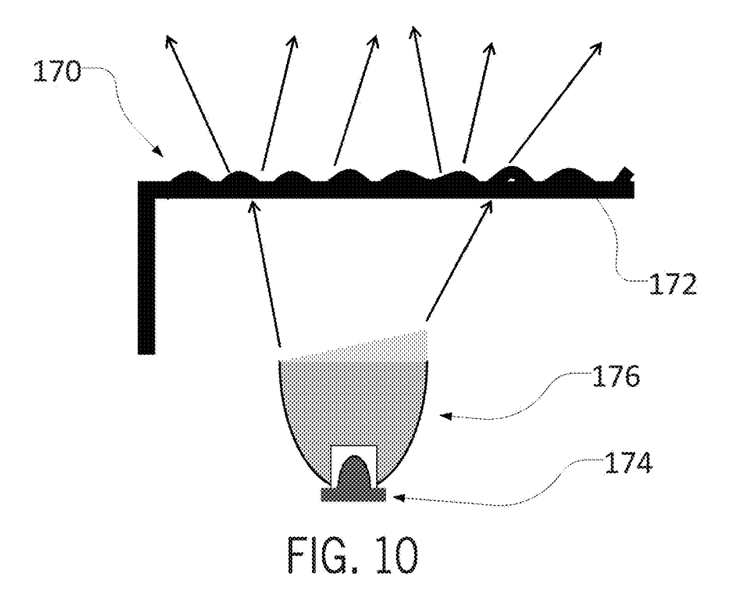
FIG. 10 is a partial schematic view of still another illumination assembly in accordance with some embodiments of the disclosure.

In some embodiments, other configurations can be used to provide similar results to those illustrated in FIGS. 8 and 9. For example, rather than (or in addition to) disposing light sources on structural wedges, the light sources can be displaced relative to an axis of a collimator or other light collector (e.g., disposed out of alignment with a light axis, such as the light axis 64 illustrated in FIG. 2). In this way, for example, light from the light collector can be directed towards a central (or other) region of an illumination target without necessarily requiring the use of structural or optical wedges.

Figure 11:
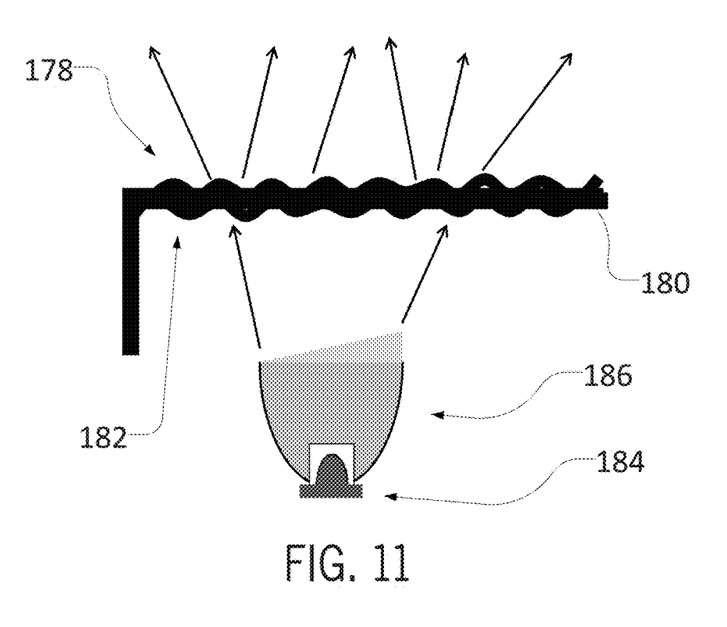
FIG. 11 is a partial schematic view of a further illumination assembly in accordance with some embodiments of the disclosure.

Diffusers configured as MLAs are discussed in various examples above. In some embodiments, as also noted above, MLAs can be molded directly onto a front window of an imaging system. As illustrated in FIG. 11, for example, an MLA 170 can be molded directly onto (or otherwise attached to) a front window 172 of an imaging assembly. Light from a light source 174, directed to the MLA 170 by a light collector 176, can accordingly be diffused into an appropriate illumination pattern by the MLA 170. Similarly, as illustrated in FIG. 12, an MLA 178 can be molded directly onto (or otherwise attached to) one side of a front window 180 of an imaging system, and an MLA 182 (e.g., with differently configured microlenses) can be molded directly onto (or otherwise attached to) another side of the front window 180. Light from a light source 184, directed to the MLAs 178 and 182 by a light collector 186, can accordingly be diffused into an appropriate illumination pattern by the MLAs 178 and 182.

Figure 12A:
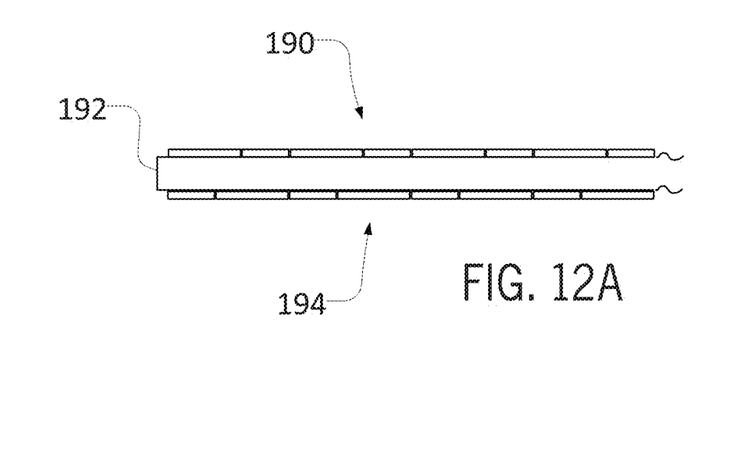
FIG. 12A is a schematic view of a set of lens arrays for use with an illumination assembly similar to that of FIG. 2.

As also noted above, in some embodiments, other types of diffusers can be used. In some embodiments, for example, diffusers such as velum paper or opal glass can be used. In some embodiments, lens arrays other than MLAs (e.g., other arrays of lenslets) can be used in place of (or in addition to) MLAs. For example, an arrangement of two overlapping lens arrays can be used as a diffuser, with lenses of one of the lens arrays exhibiting a different focal length (or focal lengths) than lenses of the other of the lens arrays. As illustrated in FIG. 12A, for example, a first lens array 190 with a first characteristic focal length can be disposed on (e.g., adhered to or formed integrally with) one side of a front window 192 of an imaging device that is generally similar to the front window 72 illustrated in FIG. 2. Further, a second lens array 194 with a second characteristic focal length different from the first characteristic focal length can be disposed on another side of the front window 192. Accordingly, light passing through the front window 192 (e.g., from various extended light sources (not shown)) can be appropriately diffused to provide a desired (e.g., relatively uniform) illumination pattern on an illumination target.

Figure 12B:
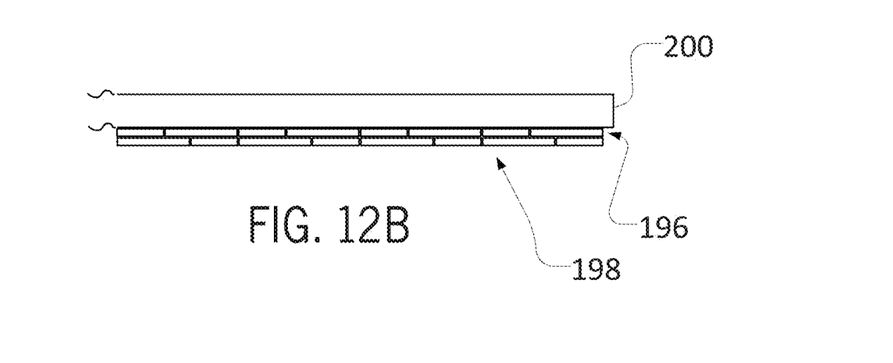
FIG. 12B is a schematic view of another set of lens arrays for use with an illumination assembly similar to that of FIG. 2.
Figure 12C:
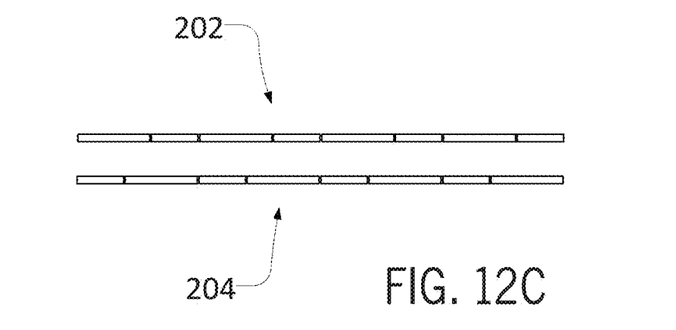
FIG. 12C is a schematic view of still another set of lens arrays for use with an illumination assembly similar to that of FIG. 2.

In other embodiments, a set of overlapping lens arrays can be configured in other ways. For example, as illustrated in FIG. 12B, a first lens array 196 with a first characteristic focal length and a second lens array 198 with a second characteristic focal length that is different from the first characteristic focal length can be disposed on the same side of a camera window 200. Similarly, as illustrated in FIG. 12C, a first lens array 202 with a first characteristic focal length and a second lens array 204 with a second characteristic focal length that is different from the first characteristic focal length can be arranged to serve as a diffuser without necessarily being disposed on a camera window. The lens arrays 202 and 204 are illustrated in FIG. 12C as spaced apart from each other (e.g., separated by an air gap). In other embodiments, different (including zero) spacing may be used.

Figure 13:
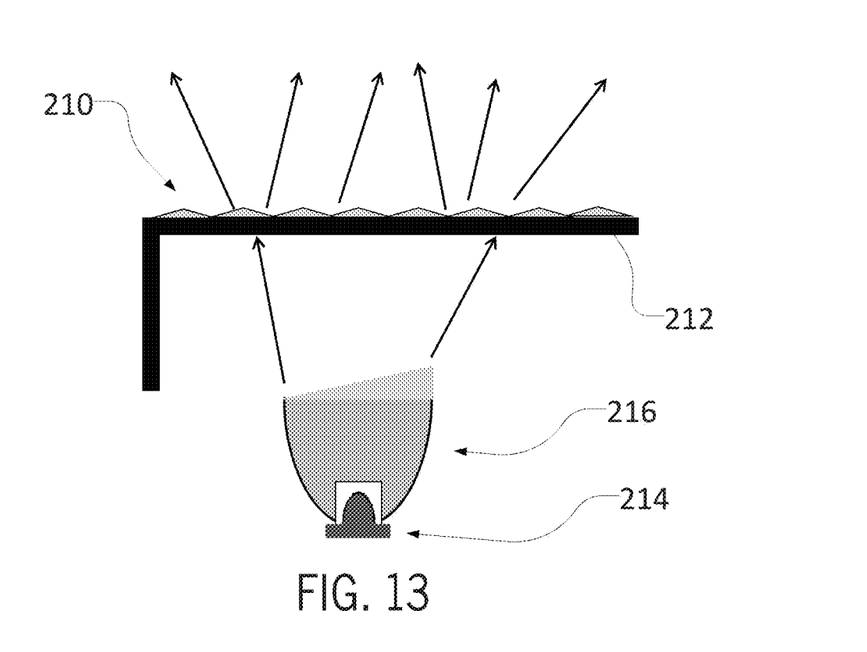
FIG. 13 is a partial schematic view of an additional illumination assembly in accordance with some embodiments of the disclosure.

As another example, a diffuser can be configured to include an array of prism diffusers. For example, as illustrated in FIG. 13, a microprism array 210 can be molded directly onto (or otherwise attached to) a front window 212 of an imaging assembly. Light from a light source 214, directed to the microprism array 210 by a light collector 216, can accordingly be diffused into an appropriate illumination pattern by the microprism array 210. In some embodiments, a microprism array (e.g., with a different configuration from the microprism array 210) can be molded onto (or otherwise attached to) an opposite side of the front window 212 than the microprism array 210.

Figure 14:
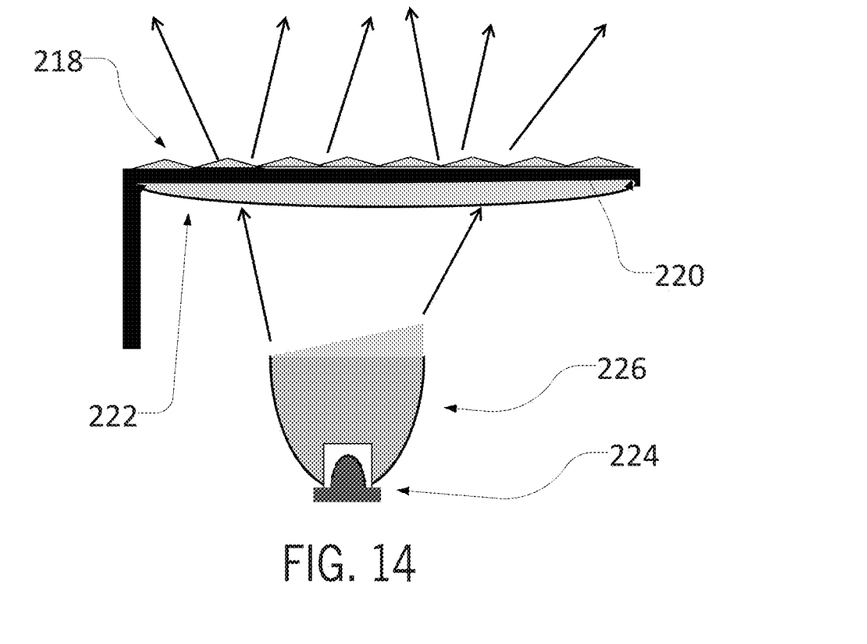
FIG. 14 is a partial schematic view of yet an additional illumination assembly in accordance with some embodiments of the disclosure.

As still another example, as illustrated in FIG. 14, an microprism array 218 can be molded onto (or otherwise attached) one side of a front window 220 of an imaging system, and a macro lens 222, such as a field lens or a Fresnel lens, can be molded onto (or otherwise attached to) another side of the front window 220. Light from a light source 224, directed to the macro lens 222 and the microprism array 218 by a light collector 226, can accordingly be diffused into an appropriate illumination pattern by the macro lens 222 and the microprism array 218.

In other embodiments, other configurations are possible, including configurations embodying different combinations of features discussed above. For example, a diffuser similar to the diffuser illustrated in FIG. 14 can include a microprism array or MLA on an opposite side of the front window than the microprism array 218 or a macro lens on an opposite side of the front window from the macro lens 222. Likewise, a diffuser similar to the diffuser illustrated in FIG. 11 can include a microprism (or other) array in place of one or both of the MLAs 178 and 182.

The particular embodiments disclosed above are illustrative only, as the technology may be modified and practiced in different but equivalent manners apparent to those skilled in the art having the benefit of the teachings herein. Further, no limitations are intended to the details of construction or design herein shown, other than as described in the claims below. It is therefore evident that the particular embodiments disclosed above may be altered or modified and all such variations are considered within the scope and spirit of the technology. Accordingly, the protection sought herein is as set forth in the claims below.

What is claimed is:

1. An illumination assembly for directing light from a first light source onto an illumination target, the illumination assembly comprising:
   a first light collector disposed to receive light from the first light source;
   a first optical wedge disposed at least partly between the first light collector and the illumination target; and
   a first diffuser disposed at least partly between the first optical wedge and the illumination target, and separated from the first optical wedge by a first air gap;
   the first light collector at least partly collimating the light received from the first light source;
   the first optical wedge bending the at least partly collimated light towards the first diffuser; and
   the first diffuser diffusing at least part of the light bent by the first optical wedge to provide a first illumination pattern on the illumination target.

2. The illumination assembly of claim 1 for further directing light from a second light source onto the illumination target, the illumination assembly further comprising:
   a second light collector disposed to receive light from the second light source;
   a second optical wedge disposed at least partly between the second light collector and the illumination target; and
   a second diffuser disposed at least partly between the second optical wedge and the illumination target, and separated from the second optical wedge by a second air gap;
   wherein the second light collector at least partly collimates the light received from the second light source;
   wherein the second optical wedge bends the at least partly collimated light towards the second diffuser; and
   wherein the second diffuser diffuses at least part of the light bent by the second optical wedge to provide a second illumination pattern on the illumination target, the second illumination pattern overlapping with the first illumination pattern over a central portion of the illumination target.

3. The illumination assembly of claim 2, wherein the first light collector and the second light collector are included in an integral light-collector body.

4. The illumination assembly of claim 3, wherein the first optical wedge and the second optical wedge are also included in the integral light-collector body.

5. The illumination assembly of claim 4, further comprising:
   an imaging sensor;
   a lens assembly; and
   a mounting frame supporting the imaging sensor, the lens assembly, the first light source, the second light source, and the integral light-collector body.

6. The illumination assembly of claim 5, wherein the integral light-collector body substantially surrounds the lens assembly.

7. The illumination assembly of claim 5, wherein the imaging sensor and the lens assembly are parts of a machine-vision imaging system.

8. The illumination assembly of claim 1, wherein the diffuser includes a lens array.

9. The illumination assembly of claim 8, wherein the lens array includes a microlens array.

10. The illumination assembly of claim 8, further comprising a transparent cover;

wherein the lens array includes an array of first lenses on a first side of the transparent cover, each of the first lenses having a respective first-lens focal length;

wherein the lens array further includes an array of second lenses on a second side of the transparent cover at least partly between the array of first lenses and the first optical wedge, each of the second lenses having a respective second-lens focal length; and wherein at least one of the first-lens focal lengths is different from at least one of the second-lens focal lengths.

11. An illumination assembly for use with a machine vision system with a lens assembly, to direct light onto an illumination target, the illumination assembly comprising:
a first extended light source;
a first light collector disposed to receive and direct light from the first extended light source; and
a first diffuser disposed at least partly between the first light collector and the illumination target;
the first diffuser being configured to diffuse at least part of the light directed by the first light collector to provide a first illumination pattern on the illumination target.

12. The illumination assembly of claim 11, further comprising:
a second extended light source;
a second light collector disposed to receive and direct light from the second extended light source; and
a second diffuser disposed at least partly between the second light collector and the illumination target;
wherein the second diffuser is configured to diffuse at least part of the light directed by the second light collector to provide a second illumination pattern that overlaps with the first illumination pattern on the illumination target.

13. The illumination assembly of claim 12, wherein the first extended light source and the second extended light source are disposed in a light-source array around the lens assembly.

14. The illumination assembly of claim 13, wherein the first light collector includes a first collimator and a first optical wedge;
wherein the second light collector includes a second collimator and a second optical wedge; and
wherein the first light collector and the second light collector are included in an integral light-collector body arranged to surround the lens assembly.

15. The illumination assembly of claim 11, wherein the first extended light source is disposed on a wedge.

16. The illumination assembly of claim 11, wherein the first light collector includes a collimator defining a collimator axis; and
wherein a central region of the first extended light source is disposed at least partly out of alignment with the collimator axis.

17. The illumination assembly of claim 11, wherein the first diffuser includes a lens array.

18. The illumination assembly of claim 11, wherein the first illumination pattern is substantially rectangular.

19. An illumination assembly for use with an imaging device having a mounting frame and a lens assembly with a lens axis, to direct light onto an illumination target, the illumination assembly comprising:
a light source arrangement supported by the mounting frame and substantially surrounding the lens axis;
a light collector array disposed between the light source arrangement and the illumination target, the light collector array being supported by the mounting frame and substantially surrounding the lens axis, the light collector array including a collimator array and a wedge array; and
a diffuser array disposed between the light collector array and the illumination target, and separated from the light collector array by an air gap;
the collimator array being arranged to receive and at least partly collimate light from the light source arrangement;
the wedge array being arranged so that light from the collimator array is directed towards the diffuser array;
the diffuser array being configured to diffuse at least part of the light from the collimator array to provide an overlapping illumination pattern on the illumination target.

20. The illumination assembly of claim 19, wherein the light collector array is configured as an integral light-collector body that substantially surrounds the lens axis; and
wherein the diffuser array includes a microlens array configured to provide substantially rectangular illumination patterns.

* * * * *